US012572016B1

(12) United States Patent
El-Haddad et al.

(10) Patent No.: US 12,572,016 B1
(45) Date of Patent: Mar. 10, 2026

(54) WAVEGUIDE ALIGNMENT WITH SCANNER

(71) Applicant: Meta Platforms Technologies, LLC, Menlo Park, CA (US)

(72) Inventors: Mohamed Tarek Ahmed El-Haddad, Redmond, WA (US); Robin Sharma, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 801 days.

(21) Appl. No.: 17/978,041

(22) Filed: Oct. 31, 2022

(51) Int. Cl.
*G02B 27/00* (2006.01)
*G02B 27/01* (2006.01)

(52) U.S. Cl.
CPC ..... *G02B 27/0172* (2013.01); *G02B 27/0093* (2013.01); *G02B 2027/0178* (2013.01); *G02B 2027/0187* (2013.01)

(58) Field of Classification Search
CPC ............ G02B 27/0172; G02B 27/0093; G02B 27/01; G02B 27/0101; G02B 27/0103; G02B 27/0149; G02B 27/017; G02B 27/0176; G02B 27/0179; G02B 27/0189; G02B 2027/0178; G02B 2027/0105; G02B 2027/0107; G02B 2027/0109; G02B 2027/011; G02B 2027/0114; G02B 2027/0112; G02B 2027/0116; G02B 2027/0118; G02B 2027/012; G02B 2027/0121; G02B 2027/0123; G02B 2027/0125; G02B 2027/0127; G02B 2027/0129; G02B 2027/0132; G02B 2027/013; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019;
(Continued)

(56) References Cited

U.S. PATENT DOCUMENTS

| | | | |
|---|---|---|---|
| 10,394,034 B2 | 8/2019 | Reshidko et al. | |
| 10,732,427 B2 | 8/2020 | Wall et al. | |

(Continued)

OTHER PUBLICATIONS

Co-pending U.S. Appl. No. 17/832,081, inventors Larocca; Francesco et al., filed Jun. 3, 2022.

*Primary Examiner* — Henry Duong
(74) *Attorney, Agent, or Firm* — Greenberg Traurig, LLP

(57) ABSTRACT

A near-eye system includes a display waveguide, an eye-tracking waveguide, and a scanner. The display waveguide is configured to present a virtual image to an eyebox region. The eye-tracking waveguide is configured to illuminate the eyebox region with illumination light. The scanner is configured to be driven to varying image scan angles to direct image light to the display waveguide to present the virtual image to the eyebox region. The scanner is also configured to be driven to one or more alignment scan angles to sense an alignment between the display waveguide and the eye-tracking waveguide.

20 Claims, 9 Drawing Sheets

100

(58) Field of Classification Search
 CPC .... G02B 2027/0192; G02B 2027/0194; G02B
   2027/0196; G02B 2027/0198
 USPC ........................................................ 359/630
 See application file for complete search history.

(56) References Cited

U.S. PATENT DOCUMENTS

| | | |
|---|---|---|
| 2022/0050292 A1 | 2/2022 | Amirsolaimani et al. |
| 2023/0221832 A1* | 7/2023 | Ahn ........................ G06F 3/013 |
| | | 715/757 |
| 2024/0318297 A1* | 9/2024 | Lee ...................... C23C 14/042 |

\* cited by examiner

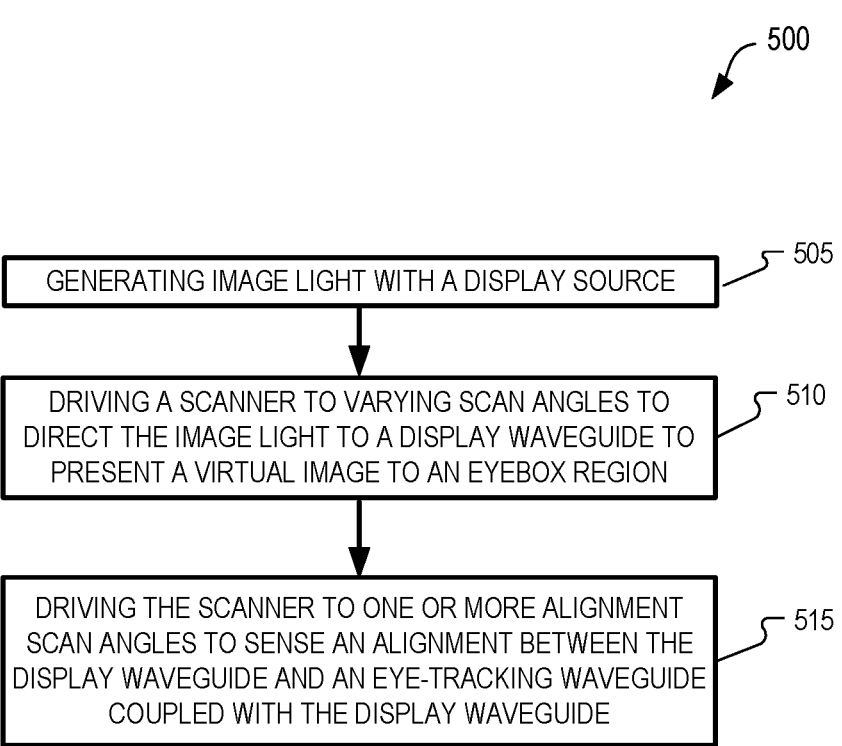

WAVEGUIDE ALIGNMENT WITH
ALIGNMENT SCAN ANGLES

500

| GENERATING IMAGE LIGHT WITH A DISPLAY SOURCE | 505 |

| DRIVING A SCANNER TO VARYING SCAN ANGLES TO DIRECT THE IMAGE LIGHT TO A DISPLAY WAVEGUIDE TO PRESENT A VIRTUAL IMAGE TO AN EYEBOX REGION | 510 |

| DRIVING THE SCANNER TO ONE OR MORE ALIGNMENT SCAN ANGLES TO SENSE AN ALIGNMENT BETWEEN THE DISPLAY WAVEGUIDE AND AN EYE-TRACKING WAVEGUIDE COUPLED WITH THE DISPLAY WAVEGUIDE | 515 |

FIG. 5

WAVEGUIDE ALIGNMENT WITH SCANNER

TECHNICAL FIELD

This disclosure relates generally to optics, and in particular to head mounted displays.

BACKGROUND INFORMATION

Virtual reality (VR), augmented reality (AR), and mixed reality (MR) devices may utilize eye-tracking to enhance the user experience and increase functionality. Some eye-tracking systems utilize a waveguide to illuminate an eyebox region with infrared light. Head mounted displays (HMDs) may also utilize a display waveguide to present virtual images to the user.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 5 illustrates a flow chart for a process of waveguide alignment measurement using alignment scan angles of a scanner, in accordance with aspects of the disclosure.

DETAILED DESCRIPTION

Figure 1:
FIG. 1 illustrates a head mounted display (HMD) that may include a near-eye system, in accordance with aspects of the disclosure.
Figure 1:
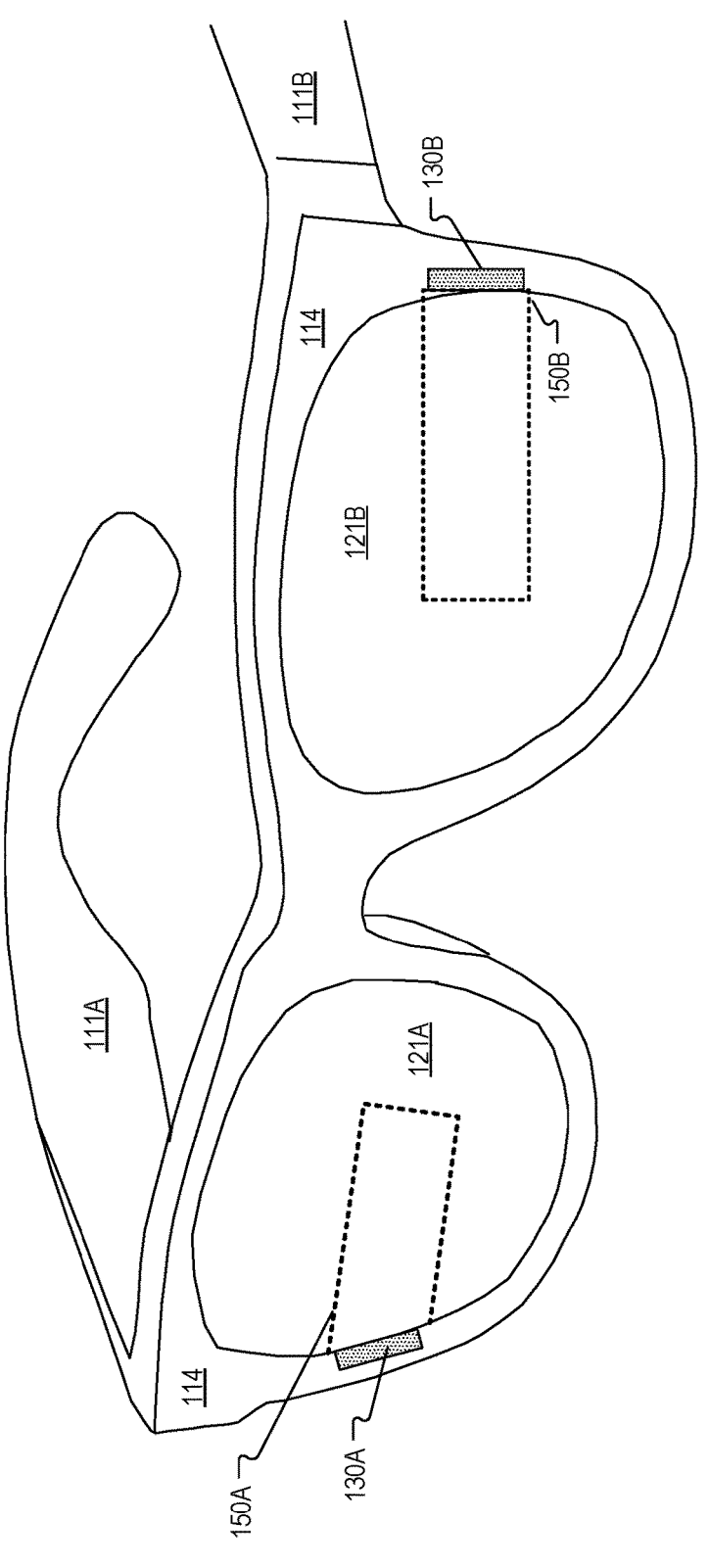

Embodiments of detecting waveguide alignment with a scanner are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

HMDs may utilize stacked waveguides such as display waveguides to present a virtual image to an eyebox region and an eye-tracking waveguide to illuminate the eyebox region with illumination light for eye-tracking purposes. Due to use, wearing position, and/or age, the alignment of the waveguides may change. The change in alignment may affect the delivery of the virtual image to the eyebox region and/or affect the eye-tracking system.

In implementations of the disclosure, an alignment between stacked waveguides is measured. Based on the measurements, alignment data is generated that represents the alignment between the stacked waveguides (e.g. display waveguide and eye-tracking waveguide). Then the display systems and/or the eye-tracking systems of an HMD can be adjusted in response to the alignment data. For example, the position of the virtual image may be delivered to a different location based on the alignment data. Or, the delivery of the illumination light (e.g. near-infrared illumination light) may be adjusted to a different location in the eyebox region based on the alignment data.

In implementations of the disclosure, a scanner that is used to scan image light into a display waveguide is utilized to present a virtual image to an eyebox region and, additionally, the scanner is used to scan light to an array of reflectors for alignment monitoring. The scanner may be a micro-electro-mechanical systems (MEMS) mirror, for example. The reflectors may be disposed between the display waveguide and the eye-tracking waveguide. A detection module is configured to receive and measure returning light reflected by the reflectors. The intensity of the returning light from a particular reflector may be compared to a baseline intensity from the reflectors that was previously measured. A difference from the measured intensity compared to the baseline intensity may represent an alignment value between the display waveguide and the eye-tracking waveguide. Reflectors in the array of reflectors may be disposed in a two-dimensional (2D) array so that the alignment values may be measured over a 2D area of an optical element of an HMD. These and other embodiments are described in more detail in connection with FIGS. 1-5.

FIG. 1 illustrates a head mounted display (HMD) 100 that may include a near-eye system, in accordance with aspects of the present disclosure. HMD 100 includes frame 114 coupled to arms 111A and 111B. Lens assemblies 121A and 121B are mounted to frame 104. Lens assemblies 121A and 121B may include a prescription lens matched to a particular user of HMD 100. The illustrated HMD 100 is configured to be worn on or about a head of a wearer of HMD 100.

In the HMD 100 illustrated in FIG. 1, each lens assembly 121A/121B includes a display waveguide 150A/150B to direct image light generated by displays 130A/130B to an eyebox region for viewing by a user of HMD 100. Displays 130A/130B may include a beam-scanning display that includes a scanning mirror, for example.

Lens assemblies 121A and 121B may appear transparent to a user to facilitate augmented reality or mixed reality to enable a user to view scene light from the environment around them while also receiving image light directed to their eye(s) by, for example, waveguides 150. Lens assemblies 121A and 121B may include two or more optical layers for different functionalities such as display, eye-tracking, and optical power. In some embodiments, image light from display 130A or 130B is only directed into one eye of the wearer of HMD 100. In an embodiment, both displays 130A and 130B are used to direct image light into waveguides 150A and 150B, respectively.

Frame 114 and arms 111 may include supporting hardware of HMD 100 such as processing logic, wired and/or wireless data interface for sending and receiving data, graphic processors, and one or more memories for storing data and computer-executable instructions. The processing logic may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

Figure 2A:
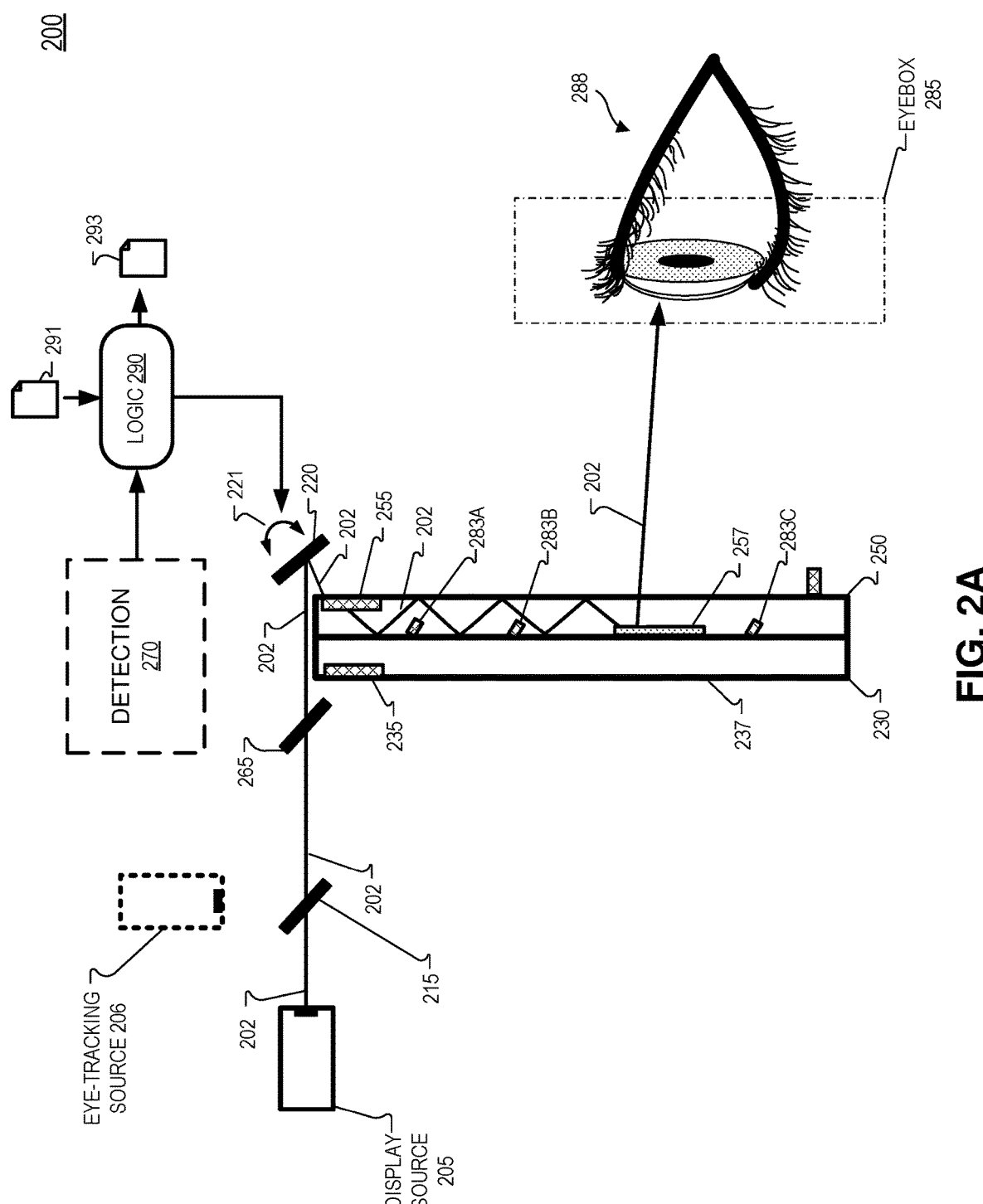
FIG. 2A illustrates a display optical path of a near-eye system, in accordance with aspects of the disclosure.

FIG. 2A illustrates a display optical path of an example near-eye system 200, in accordance with implementations of the disclosure. Example near-eye system 200 may be included in HMD 100 to display virtual images to a user and for eye-tracking functionality. Example near-eye system 200 includes a display light source 205, an eye-tracking light source 206, a scanner 220, a display waveguide 250, an eye-tracking waveguide 230, a detection module 270, and processing logic 290. Display waveguide 250 and eye-tracking waveguide 230 may be included in lens assemblies 121 in FIG. 1, for example. Display light source 205 may include one or more light sources. Display light source 205 may include a red light source, a green light source, and a blue light source, for example. Display light source 205 may include one or more lasers.

Figure 2B:
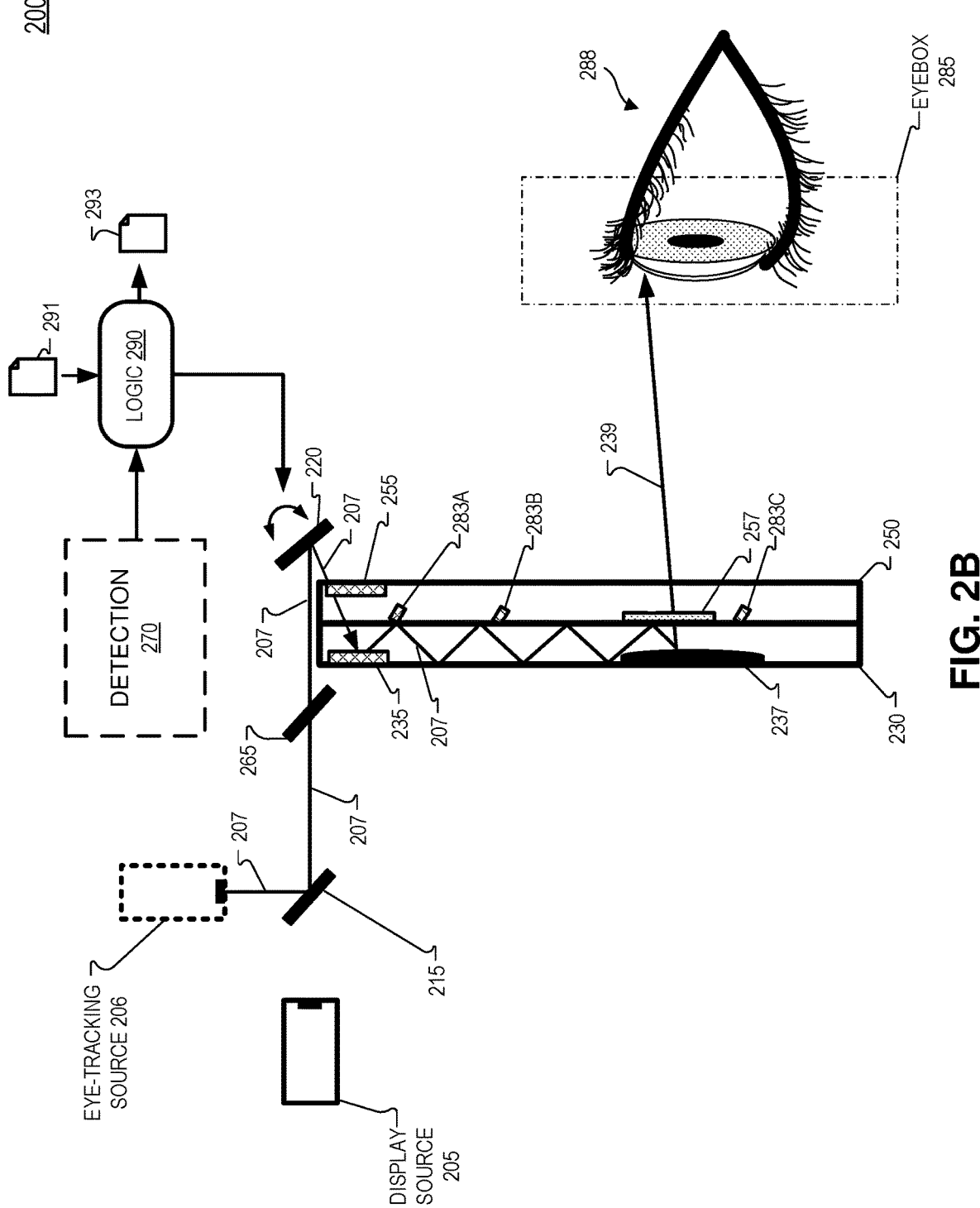
FIG. 2B illustrates an eye-tracking illumination path of the near-eye system, in accordance with aspects of the disclosure.

In operation, display light source 205 emits image light 202. Image light 202 includes visible light. At least a portion of image light 202 propagates through optical element 215 and optical element 265 and continues to scanner 220 as image light 202. Optical element 215 may be a dichroic reflector that passes visible light and reflects infrared light. Optical element 265 may be a beam splitter that passes a portion of light and reflects a remaining portion of light. Optical element 265 may be a 50/50 beam splitter, in some implementations. Optical element 265 may be configured as a dichroic beam splitter that passes visible wavelengths (e.g.

image light 202) and splits a portion of infrared light (e.g. the wavelength of infrared light 207 to be discussed in FIG. 2B). In some implementations, optical element 265 is disposed between optical element 215 and eye-tracking light source 206 so that image light 202 does not encounter optical element 265 in near-eye system 200. In this implementation, optical element 265 may be a beam splitter that is angled to reflect/direct a portion of returning infrared light to detection module 270.

Scanner 220 receives image light 202 and directs image light 202 to input coupler 255 of display waveguide 250 at varying image scan angles 221, although a single image scan angle 221 of scanner 220 is illustrated in FIG. 2A for descriptive purposes. Input coupler 255 may be holographic optical element (HOE). Input coupler 255 incouples image light 202 into display waveguide 250 to present a virtual image to an eyebox region 285 to be viewable by an eye 288 of a user of an HMD (e.g. HMD 100). In an implementation, input coupler 255 is configured to diffract visible light at a diffraction angle that allows display waveguide 250 to confine the image light 202 to propagate within display waveguide 250 by way of total internal reflection (TIR). Image light 202 propagates in display waveguide 250 until encountering a display output coupler 257. Display output coupler 257 may be configured to cause image light 202 to exit display waveguide 250 by directing the image light 202 to exit display waveguide 250 beyond a critical angle of display waveguide 250 to direct the image light 202 to eyebox region 285.

Scanner 220 may be driven to various image scan angles 221 by processing logic 290 based on a virtual image 291 that is to be presented to a user of the head mounted display. Hence, scanner 220 may scan out the virtual image 291 to eyebox region 285 by directing the image light 202 to various scan points within eyebox region 285. The various image scan angles 221 of scanner 220 may correspond to different x-y coordinates on input coupler 255, different x-y coordinates on display output coupler 257, and/or different diffraction angles in order to deliver the image light 202 to a particular scan point in a particular time frame. As will be described in more detail below, scanner 220 may also utilize alignment scan angles (that are different from the image scan angles 221) to direct light to reflectors 283A, 283B, and/or 283C for alignment measurement purposes. Scanner 220 may include a micro-electro-mechanical systems (MEMS) scanner having a reflective surface that can be moved/adjusted along two rotation axes.

Input coupler 255 may be a diffractive optical element. Input coupler 255 may be configured to diffract specific wavelength bands of image light 202. In an implementation, image light 202 includes narrow-band red light, narrow-band green light, and narrow-band blue light and input coupler 255 is configured to diffract the narrow-band red light, narrow-band green light, and narrow-band blue light into display waveguide 250 while passing (undiffracted) other wavelengths of light such as infrared light. Input coupler 255 may be configured to direct image light 202 to display output coupler 257 when scanner 220 is driven to the image scan angles 221 and input coupler 255 may be configured to direct image light 202 to reflectors 283A, 283B, and/or 283C when scanner 220 is driven to the alignment scan angles.

FIG. 2B illustrates an example eye-tracking illumination path of near-eye system 200, in accordance with implementations of the disclosure. In operation, eye-tracking light source 206 emits infrared light 207. Infrared light 207 may be near-infrared light. Eye-tracking light source 206 may include an infrared light source that emits infrared light. The infrared light source may be an LED or a laser, for example. The infrared light source may be a near-infrared light source. Infrared light 207 may be collimated light. Infrared light 207 may have a linewidth less than 1 nm in some implementations.

Infrared light 207 encounters optical element 215 subsequent to being emitted by eye-tracking light source 206. Optical element 215 directs infrared light 207 to scanner 220 through optical element 265. Optical element 215 may be a dichroic reflector that passes visible light and reflects infrared light. Optical element 215 may reflect the specific wavelength of infrared light 207 emitted by an infrared light source included in eye-tracking light source 206 while passing the wavelengths of image light 202.

Infrared light 207 encounters optical element 265 prior to propagating to scanner 220, in the illustrated example. Optical element 265 may be a beam splitter. Optical element 265 may be a dichroic beam spitter that passes almost all visible light and splits the infrared light wavelength associated with infrared light 207. Hence, optical element 265 may pass image light 202 and reflect a portion of infrared light 207.

The portion of infrared light 207 that propagates through optical element 265 encounters scanner 220 and may be directed to the input coupler 255 of display waveguide 250. Input coupler 255 passes the infrared light 207 to eye-tracking waveguide 230. In some implementations, input coupler 255 diffracts infrared light 207 to eye-tracking waveguide 230 at an angle that is not conducive to TIR within display waveguide 250. In some implementations, eye-tracking input coupler 235 of eye-tracking waveguide 230 receives the infrared light 207 from scanner 220 through input coupler 255. In the illustrated implementation, input coupler 255 passes infrared light 207 (undiffracted) to eye-tracking input coupler 235. In other implementations, input coupler 255 may redirect the infrared light 207 to eye-tracking input coupler 235. Input coupler 255 may diffract the infrared light 207 to eye-tracking input coupler 235.

Eye-tracking input coupler 235 may direct infrared light 207 into eye-tracking waveguide 230 so that infrared light 207 is guided to eye-tracking output coupler 237. Eye-tracking output coupler 237 directs the infrared light 207 to eyebox region 285 as infrared illumination light 239. Output coupler 237 may be a two-dimensional output coupler where the exit angle of infrared illumination light 239 is dependent on the position and/or angle that infrared light 207 becomes incident on output coupler 237.

In some implementations, scanner 220 directs the image light 202 of FIG. 2A and the infrared light 207 of FIG. 2B to input coupler 255 contemporaneously. This may result in image light 202 and infrared illumination light 239 illuminating the eyebox region 285 simultaneously. In an implementation, scanner 220 directs image light 202 and infrared light 207 to input coupler 255 sequentially and display light source 205 and eye-tracking light source 206 are selectively activated to synchronize with scanner 220. Waveguides 230 and 250 may be considered "stacked waveguides" due to their close proximity and generally being disposed in parallel with each other. Waveguides 230 and 250 may be coupled together by an optical adhesive or waveguides 230 and 250 may be separated by a small airgap.

Figure 2C:
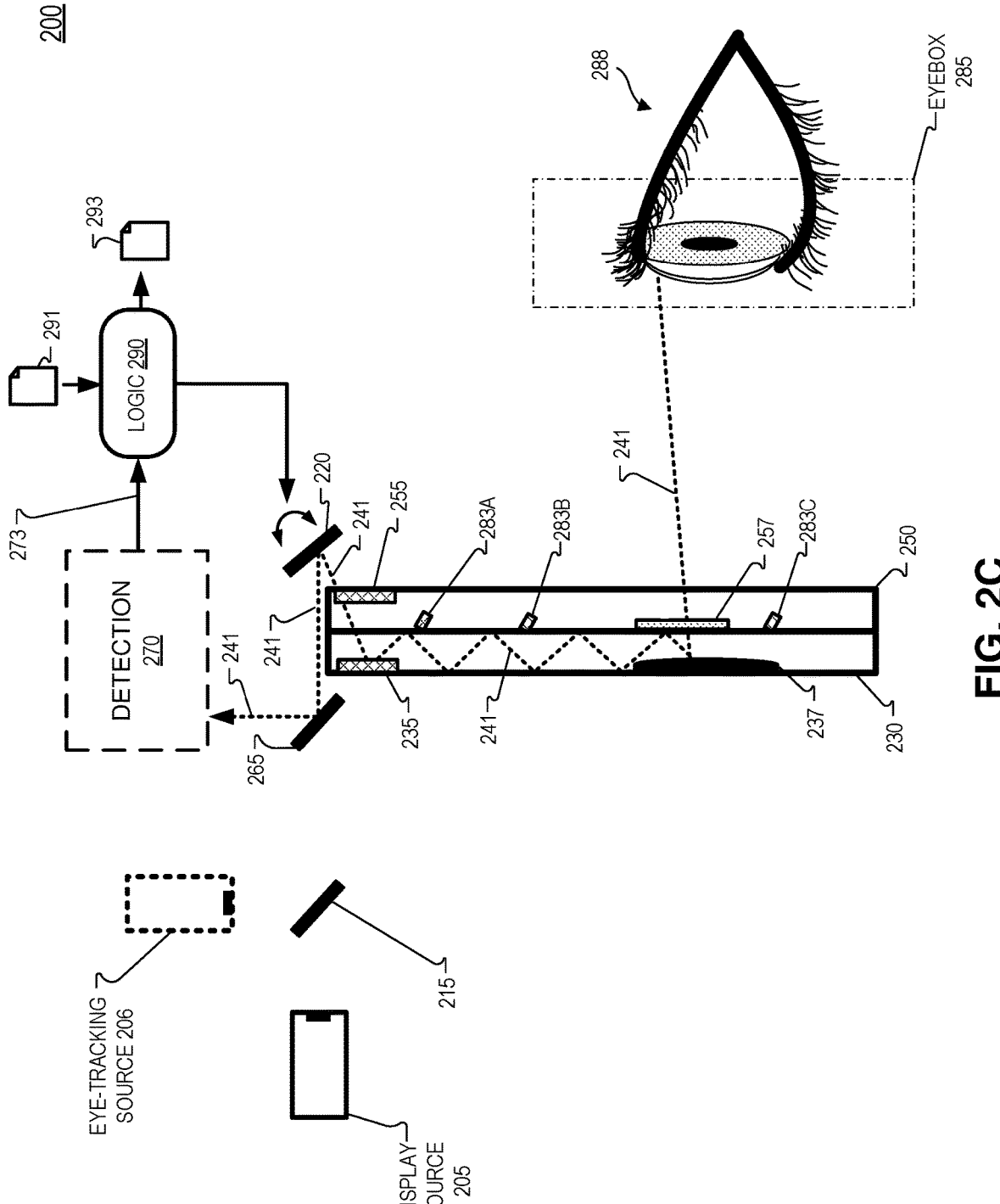
FIG. 2C illustrates a sensing path of the near-eye system, in accordance with aspects of the disclosure.

FIG. 2C illustrates a sensing path of near-eye system 200, in accordance with implementations of the disclosure. Near-eye system 200 may include a double-pass feature that includes returning infrared light 241 (reflected or scattered from eyebox region 285) propagating along a reverse optical path of the infrared light 207 propagating in eye-tracking waveguide 230. Returning infrared light 241 is the portion of infrared illumination light 239 being reflected or scattered by eye 288 (or skin/eyelashes around eye 288) back to output coupler 237 in a reverse optical path of the infrared illumination light 239 illustrated in FIG. 2B. Returning infrared light 241 may be incident on output coupler 237 at a same position as infrared illumination light 239 exited output coupler 237 and output coupler 237 may direct returning infrared light 241 to propagate in waveguide 230 toward input coupler 235. Input coupler 235 may direct returning infrared light 241 back to scanner 220 which reflects the returning infrared light to optical element 265. Given the speed of light, scanner 220 is in the same scan position (same scan angle) when infrared light 207 of FIG. 2B is reflected by scanner 220 and when returning infrared light 241 is reflected by scanner 220.

FIG. 2C illustrates that optical element 265 (e.g. a beam splitter or a dichroic beam splitter) directs at least a portion of returning infrared light 241 to detection module 270. Detection module 270 is configured to generate a tracking signal 273 in response to returning infrared light 241 becoming incident on a sensor included in detection module 270. The returning infrared light 241 propagates to the sensor via scanner 220 and via output coupler 237.

Processing logic 290 receives the tracking signal(s) 273 from detection module 270. Processing logic 290 may be communicatively coupled to scanner 220 to drive scanner 220 to various scan angles. Detection module 270 may generate a tracking signal 273 corresponding to each of the scan angles that scanner 220 is driven to. These tracking signals 273 may be aggregated by processing logic 290 to generate an eye-tracking image 293. The scan angles of scanner 220 and corresponding scan points in eyebox region 285 may also be used to present a virtual image 291 (by way of image light 202 scanned by way of display waveguide 250) to eyebox region 285. Thus, the varying scan angles of scanner 220 may be used for both presenting the virtual image 291 to eyebox region 285 with visible image light 202 and generating an eye-tracking image with infrared light 207 and returning infrared light 241.

In an implementation, processing logic 290 drives scanner 220 to scan image light to scan points within the eyebox region to generate an eye-tracking image with a plurality of tracking signals corresponding to each of the scan points. In the illustrated implementation of FIGS. 2A-2C, processing logic 290 may be configured to drive scanner 220 to progress through the varying scan angles in a repeatable scan sequence to illuminate scan points in eyebox region 285 with infrared illumination light 239.

While FIGS. 2A-2C provide an example near-eye system 200, there may be various additional optical elements (not particularly illustrated) in various implementations of the disclosure. For example, refractive or diffractive focusing optics and/or mirrors may be used to focus or redirect image light 202 and/or infrared light 207 before and/or after encountering scanner 220.

Figure 2D:
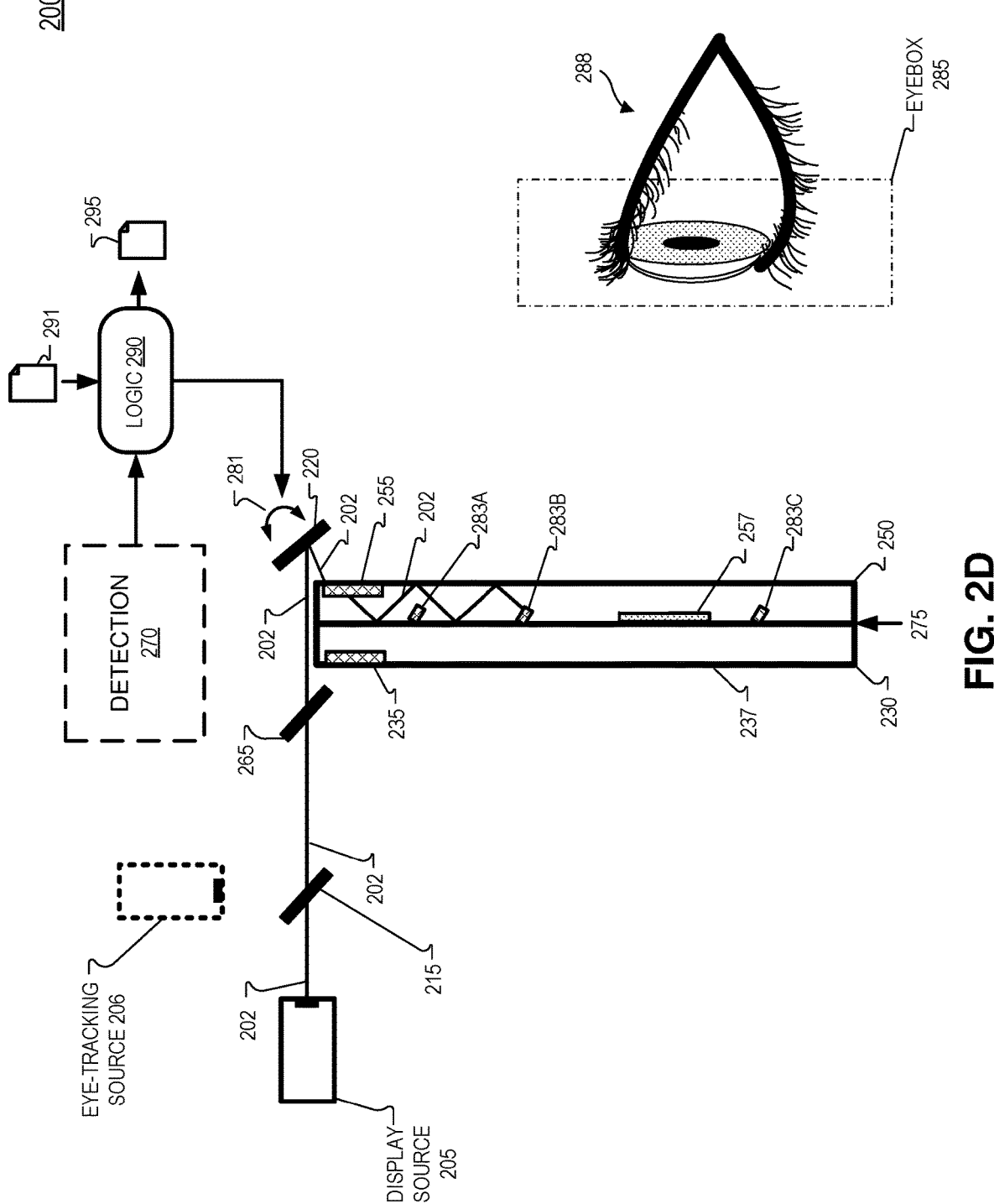
FIG. 2D illustrates an example alignment illumination path of the near-eye system, in accordance with aspects of the disclosure.

FIG. 2D illustrates an example alignment illumination path of near-eye system 200, in accordance with implementations of the disclosure. In operation, scanner 220 is driven to alignment scan angle(s) 281 so that an alignment between display waveguide 250 and eye-tracking waveguide 230 can be sensed. In the illustrated implementation, scanner 220 is driven to alignment scan angle 281 by processing logic 290 to direct image light 202 to reflector 283B, although scanner 220 may also direct infrared light 207 or light from another light source to reflector 283B to detect an alignment between display waveguide 250 and eye-tracking waveguide 230.

FIG. 2D illustrate an array of reflectors 283A, 283B, and 283C (collectively referred to as reflectors 283) disposed along a boundary between eye-tracking waveguide 230 and display waveguide 250. In some implementations, reflectors 283 may be included in display waveguide 250. In some implementations, reflectors 283 are immersed in a transparent refractive material that forms display waveguide 250. In some implementations (not specifically illustrated), reflectors 283 are included in eye-tracking waveguide 230.

Figure 3:
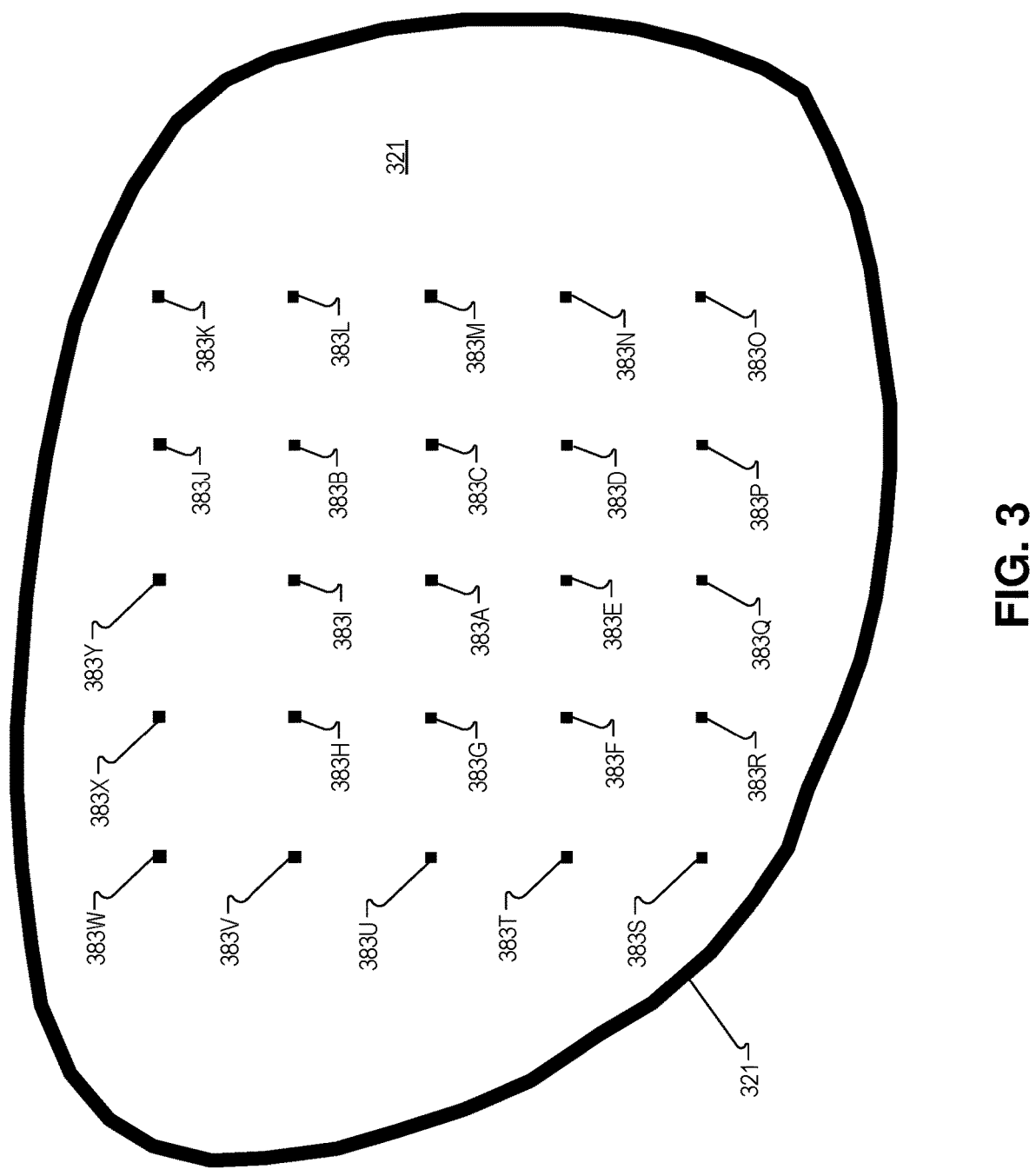
FIG. 3 illustrates an optical element that includes an array of example reflectors that are disposed along a boundary between an eye-tracking waveguide and a display waveguide, in accordance with aspects of the disclosure.

The array of reflectors 283 may be disposed along a one-dimensional line or disposed in a two-dimensional array. FIG. 3 illustrates an optical element 321 that includes an array of example reflectors 383 that are disposed along a boundary between an eye-tracking waveguide and a display waveguide, in accordance with aspects of the disclosure. The eye-tracking waveguide and the display waveguide are also included in optical element 321, although they are not specifically illustrated for purposes of illustrating the array of reflectors 383. The reflectors 383 of FIG. 3 may be included in optical element 121 of FIG. 1A, for example. FIG. 3 illustrates an approximate 5×5 array of reflectors 383A-383Y that may be disposed along the boundary of the stacked waveguides 230 and 250 illustrated in near-eye system 200. However, different geometries and different numbers of reflectors may be implemented as the array of reflectors 283.

Reflectors 283 or 383 include a reflective layer configured to reflect light back to scanner 220. Reflectors 283 or 383 may be polarization selective to a polarization orientation of light received from scanner 220. Reflectors 283 or 383 may be formed of a mirrored surface such as a metal. Reflectors 283 or 383 may also be formed of a diffractive optical element. Reflectors 283 or 383 may include a Bragg grating that is wavelength-tuned and/or angle-tuned to reflect light back to scanner 220 along a reverse-optical path. By way of example, reflectors 283/383 may be wavelength-tuned to reflect a particular narrow-band wavelength of image light 202 or infrared light 207. When image light 202 includes narrow-band red, green, and blue image light from red, green, and blue laser sources, reflectors 283/383 may be configured to reflect just the red, green, or blue laser light back to scanner 220. In some implementations, "narrow-band" is defined as having a linewidth of less than 3 nm. Reflectors 283 or 383 may be sized (e.g. in microns) so that they are too small to be noticeable to the unassisted eye.

Returning back to FIG. 2D, reflectors 283 may be angled to reflect the light from scanner 220 back to scanner 220 in a reverse optical path. Reflectors 283 may be angled with respect to a surface 275 that defines a boundary of display waveguide 250. Scanner 220 is driven to alignment scan angle 281 to direct the light to reflector 283B. Input coupler 255 may be configured to diffract the light at a diffraction angle that allows display waveguide 250 to confine the light to propagate within display waveguide 250 by way of TIR and the light propagates in display waveguide 250 until encountering a reflector 283B. Alignment scan angle(s) 281 are different from the image scan angles 221 that are used to present virtual image 291 to eyebox region 285. Different alignment scan angles 281 may be used by scanner 220 to direct the light to different reflectors than 283B.

Figure 2E:
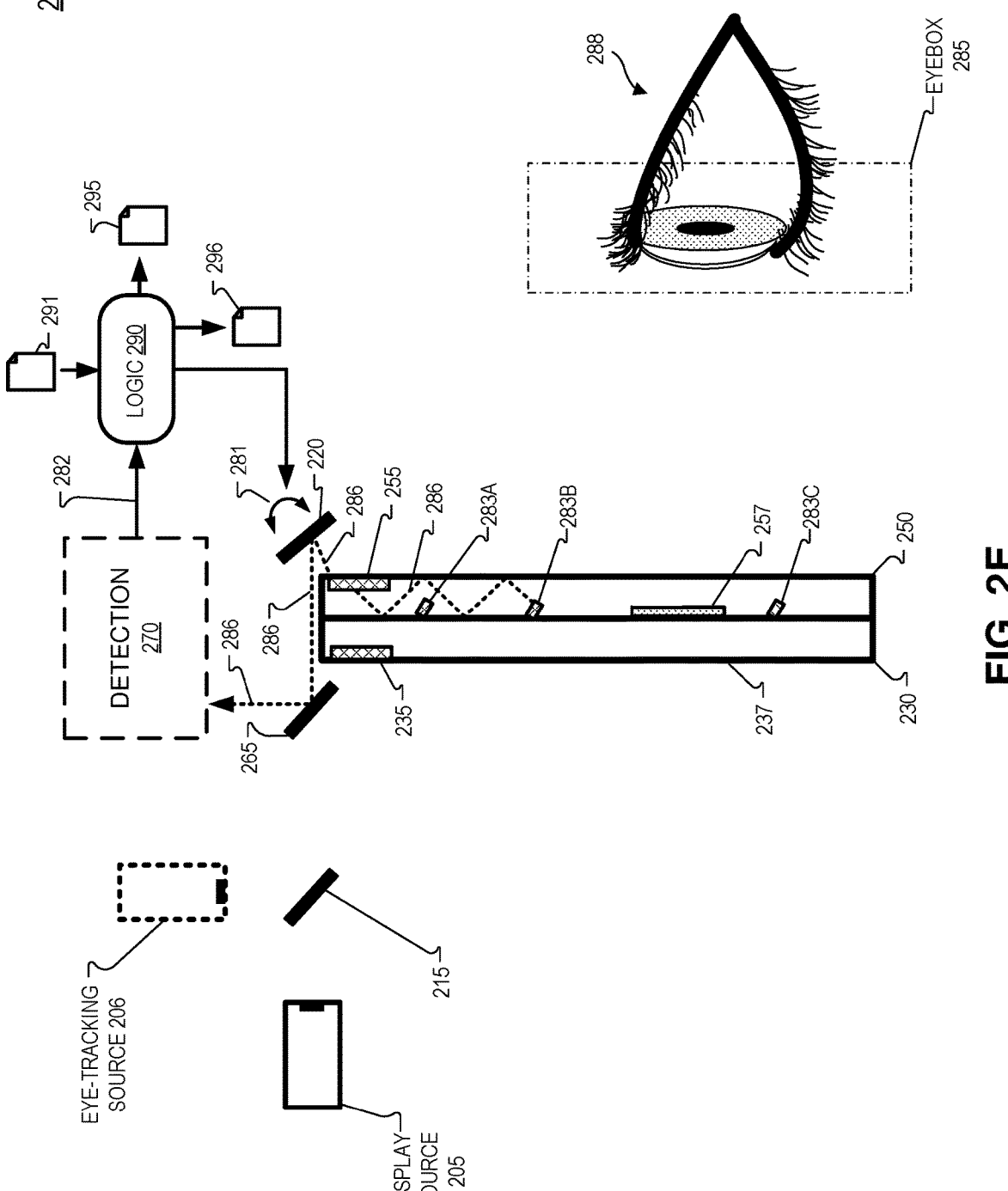
FIG. 2E illustrates an example alignment sensing path of the near-eye system, in accordance with aspects of the disclosure.

FIG. 2E illustrates an example alignment sensing path of near-eye system 200, in accordance with implementations of the disclosure. Reflector 283B reflects the light back to scanner 220 as returning light 286. Scanner 220 reflects returning light 286 to detection module 270 by way of optical element 265, in the illustrated implementation of FIG. 2E.

In implementations where reflectors 283 are included in eye-tracking waveguide 230 (not specifically illustrated), the alignment illumination path and the alignment sensing path of near-eye system 200 runs through eye-tracking waveguide 230 instead of the alignment illumination path and the alignment sensing path running through display waveguide 250, as illustrated in FIG. 2D. In these implementations, scanner 220 directs light to reflectors 283 included in eye-tracking waveguide 230. The illumination path in these implementations may encounter input coupler 235 and light from eye-tracking light source 206 may be used to illuminate the reflectors in eye-tracking waveguide 230.

Figure 4:
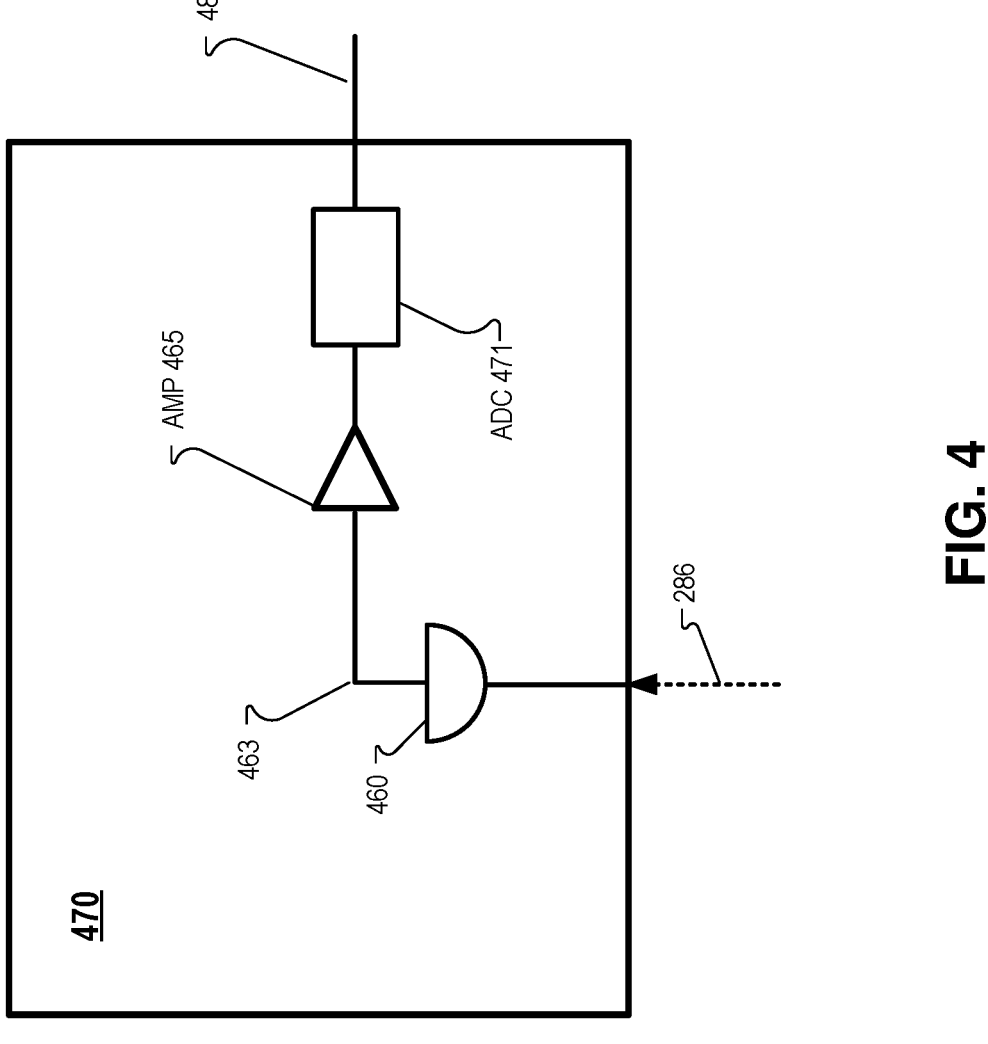
FIG. 4 illustrates an example detection module for generating alignment measurements from returning light, in accordance with aspects of the disclosure.

FIG. 4 illustrates an example detection module 470 for generating alignment measurements 482 from returning light 286, in accordance with implementations of the disclosure. FIG. 4 illustrates an example detection module 470 that includes a sensor 460, an amplifier 465, and analog-to-digital converter (ADC) 471. Sensor 460 is a light-sensitive sensor. Sensor 460 may include one or more photodiodes. Sensor 460 is configured to generate an alignment signal 463 in response to returning light 286 incident on sensor 460 via scanner 220. Alignment signal 463 may be amplified by amplifier 465 and ADC 471 may generate a digital alignment signal 482 that is provided to processing logic 290.

Processing logic 290 may be configured to generate alignment data 295 based at least in part from alignment signals 463 and digital alignment signals 482. As scanner 220 scans through illuminating different reflectors 283 in the array of reflectors, alignment signals 463 may be generated by sensor 460 for each reflector in the array and stored to memory. In an implementation, processing logic 290 is configured to generate alignment data 295 based at least in part on a plurality of alignment signals 463 that are read-out sequentially from sensor 460 as scanner 220 scans through the reflectors in the array. In some implementations, generating the alignment data 295 includes comparing alignment measurements 482 with baseline reflection measurements for the reflector 283 that generated the returning light 286 that generated the alignment measurement 482. The baseline reflection measurements may be generated during manufacturing of the head mounted device and stored to memory for subsequent comparison.

FIG. 5 illustrates a flow chart for a process 500 of waveguide alignment measurement using alignment scan angles of a scanner, in accordance with implementations of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. All or a portion of process 500 may be executed by processing logic 290, for example In process block 505, image light is generated with a display light source. The image light (e.g. image light 202) is visible light.

In process block 510, a scanner (e.g. scanner 220) is driven to varying image scan angles (e.g. image scan angles 221) to direct the image light to a display waveguide to present a virtual image to an eyebox region.

In process block 515, the scanner is driven to one or more alignment scan angles (e.g. alignment scan angles 281) to sense an alignment between the display waveguide and an eye-tracking waveguide coupled with the display waveguide.

In an implementation, driving the scanner to the one or more alignment scan angles includes sequentially directing light (e.g. image light 202) to reflectors disposed along a boundary of the eye-tracking waveguide and the display waveguide.

In some implementations, process 500 further includes generating alignment measurements from returning light reflected by the reflectors and generating alignment data based on the alignment measurements. The alignment measurements represent an alignment between the display waveguide and the eye-tracking waveguide.

In an implementation, generating the alignment data includes comparing the alignment measurements with baseline reflection measurements for the reflectors. The baseline reflection measurements for each reflector may be an intensity measurement of returning light reflected back to scanner by a particular reflector when the scanner is driven to an alignment scan angle that illuminates the particular reflector. The baseline reflection measurement may be taken at the factory during assembly or fabrication of an HMD. The baseline reflection measurements for the array of reflectors may be stored in a memory accessible to processing logic 290, for example. A difference between an intensity of the alignment measurement and an intensity of the baseline reflection measurement for a particular reflection may be included in alignment data 295. In some implementations, the larger the intensity difference between an intensity of the alignment measurement and an intensity of the baseline reflection measurement, the larger the alignment change between an eye-tracking waveguide and a display waveguide. The alignment difference may be different for different positions and thus the intensity difference between different reflectors 283/383 may be different.

An implementation of process 500 further includes adjusting a position of the virtual image in response to the alignment between the display waveguide and the eye-tracking waveguide. Each reflector 283/383 is at an alignment position between waveguide 230 and 250. As stated above, the alignment between the display waveguide 250 and the eye-tracking waveguide 230 may become misaligned due to wear or use. Thus, by detecting the alignment of reflectors 283/383 allows for an adjustment to either the eye-tracking system or the display system to adjust for the new alignment between the display waveguide 250 and the eye-tracking waveguide 230. For example, the scanner 220 may be driven at different scan angles to illuminate a different portion of eyebox region 285 based on alignment data 295. A different alignment between the display waveguide and eye-tracking waveguide may warrant presenting the virtual image in a different position in eyebox region 285. A different alignment between the display waveguide and eye-tracking waveguide may also warrant illuminating in a different position in eyebox region 285 with illumination light 239, for example.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 290) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A near-eye system comprising:
a display waveguide configured to present a virtual image to an eyebox region;
an eye-tracking waveguide configured to illuminate the eyebox region with illumination light; and
a scanner configured to be driven to varying image scan angles to direct image light to the display waveguide to present the virtual image to the eyebox region, wherein the scanner is configured to be driven to one or more alignment scan angles to sense an alignment between the display waveguide and the eye-tracking waveguide.

2. The near-eye system of claim 1 further comprising:
an array of reflectors disposed along a boundary between the eye-tracking waveguide and the display waveguide, wherein the scanner is configured to illuminate the array of reflectors with light at different alignment scan angles; and
a detection module configured to receive and measure returning light, wherein the returning light is the light reflected by the reflectors in the array of reflectors.

3. The near-eye system of claim 2, wherein the returning light is directed to the detection module by the scanner while the scanner is driven to the alignment scan angle that directed the light to a particular reflector in the array of reflectors.

4. The near-eye system of claim 2, wherein the display waveguide includes an input coupler configured to incouple the image light into the display waveguide to deliver the virtual image to the eyebox region, and wherein the input coupler is configured to incouple the light into the display waveguide to propagate to the reflectors in the array.

5. The near-eye system of claim 2 further comprising:
processing logic configured to generate alignment data from alignment measurements received from the detection module, wherein the alignment measurements are measurements of the returning light reflected by the reflectors.

6. The near-eye system of claim 2, wherein the reflectors in the array of reflectors are angled to reflect the light along a reverse optical path back to the scanner.

7. The near-eye system of claim 6, wherein the reflectors include Bragg gratings configured to reflect a narrow-band wavelength of the light back to the scanner, and wherein the Bragg gratings are angle-tuned to reflect the light received from the scanner.

8. The near-eye system of claim 6, wherein the reflectors include a reflective layer configured to reflect of the light back to the scanner.

9. The near-eye system of claim 6, wherein the reflectors are polarization selective to a polarization orientation of the light received from the scanner.

10. The near-eye system of claim 1, wherein the image scan angles are different from the alignment scan angles.

11. The near-eye system of claim 1 further comprising:
a display light source configured to illuminate the scanner with the image light, wherein the scanner is configured to direct the image light to a reflector while the scanner is driven to the one more alignment scan angles, wherein the reflector is included in the display waveguide or the eye-tracking waveguide.

12. The near-eye system of claim 11, wherein the display waveguide includes an input coupler configured to incouple the image light into the display waveguide to present a virtual image to an eyebox region, wherein the input coupler is configured to receive light from the scanner and directs the light to the reflector.

13. A computer-implemented method comprising:
generating image light with a display light source, wherein the image light is visible light;
driving a scanner to varying image scan angles to direct the image light to a display waveguide to present a virtual image to an eyebox region; and
driving the scanner to one or more alignment scan angles to sense an alignment between the display waveguide and an eye-tracking waveguide coupled with the display waveguide.

14. The computer-implemented method of claim 13, wherein the driving the scanner to the one or more alignment scan angles includes sequentially directing light to reflectors disposed along a boundary of the eye-tracking waveguide and the display waveguide.

15. The computer-implemented method of claim 14 further comprising:
generating alignment measurements from returning light returning light reflected by the reflectors; and
generating alignment data based on the alignment measurements, wherein the alignment measurements represent an alignment between the display waveguide and the eye-tracking waveguide.

16. The computer-implemented method of claim 15, wherein generating the alignment data includes comparing the alignment measurements with baseline reflection measurements for the reflectors.

17. The computer-implemented method of claim 14, wherein the reflectors are angled to reflect the light along a reverse optical path back to the scanner.

18. The computer-implemented method of claim 13, wherein the image scan angles are different from the alignment scan angles.

19. The computer-implemented method of claim 13 further comprising:
adjusting a position of the virtual image in response to the alignment between the display waveguide and the eye-tracking waveguide.

20. A head mounted display (HMD) comprising:
a frame securing a lens, wherein the lens includes:
  a display waveguide configured to present a virtual image to an eyebox region; and
  an eye-tracking waveguide configured to illuminate the eyebox region with illumination light, wherein the display waveguide is coupled with the eye-tracking waveguide; and
a scanner configured to be driven to varying image scan angles to direct image light to the display waveguide to present the virtual image to the eyebox region, wherein the scanner is configured to be driven to one or more alignment scan angles to sense an alignment between the display waveguide and the eye-tracking waveguide.

\* \* \* \* \*